US006402216B1

(12) United States Patent
McManus et al.

(10) Patent No.: US 6,402,216 B1
(45) Date of Patent: Jun. 11, 2002

(54) ABOVE-FLOOR TRAVEL TILT RETRACTABLE ROOM SUPPORT

(75) Inventors: Patrick W. McManus, Osecola; James E. Dewald, Jr.; Martin P. McManus, both of Mishawaka, all of IN (US)

(73) Assignee: VT Holdings II, Inc., Reno, NV (US)

( * ) Notice: Subject to any disclaimer, the term of this patent is extended or adjusted under 35 U.S.C. 154(b) by 0 days.

(21) Appl. No.: 09/753,203

(22) Filed: Jan. 2, 2001

(51) Int. Cl.[7] .................................................. B60P 3/34
(52) U.S. Cl. ............................. 296/26.14; 296/26.01; 296/26.15; 296/165; 296/175
(58) Field of Search ........................... 296/26.01, 26.12, 296/26.13, 26.14, 26.15, 165, 175

(56) References Cited

U.S. PATENT DOCUMENTS

| | | | | |
|---|---|---|---|---|
| 5,193,878 A | * | 3/1993 | Weaver | ........................ 296/26 |
| 5,785,373 A | * | 7/1998 | Futrell et al. | ............ 296/26.01 |
| 6,048,016 A | * | 4/2000 | Futrell et al. | ............ 296/26.13 |

* cited by examiner

Primary Examiner—Joseph D. Pape
Assistant Examiner—Lori L Coletta
(74) Attorney, Agent, or Firm—Baker & Daniels

(57) ABSTRACT

Transportable living quarters includes a main frame supporting a main living area and a slide-out room that slides between an extended and retracted position relative to the main living area. The actuation mechanism for extending and retracting the slide-out room includes a curved slider arm that causes the slide-out room to tilt slightly when moving into the fully extended or retracted positions. Upon extension, the slide-out room tilts outwardly to compress an inner compressible seal between sealing surfaces on the main living area and the slide-out room inner flange. Upon retraction, the slide-out room tilts in the opposite direction to compress an outer compressible seal between sealing surfaces on the outside of the main living area and the outer flange of the slide-out room. This tilting of the room results in a tighter seal at the top of the slide-out room that better isolates the living area from the outside elements.

17 Claims, 7 Drawing Sheets

ABOVE-FLOOR TRAVEL TILT RETRACTABLE ROOM SUPPORT

FIELD OF THE INVENTION

This invention relates to recreational vehicles or manufactured housing units having a retractable room in which the retractable room is tilted as it moves into its fully extended and fully retracted positions to achieve a tight seal along the upper flange of the room.

BACKGROUND OF THE INVENTION

The width of recreational vehicles and manufactured housing units are limited to that which may be accommodated for travel on public roads. Accordingly, it is increasingly common to provide recreational vehicles and manufactured housing units with a slide-out room that can be retracted into the main living quarters when the unit is being moved or driven, but which can be extended from the main living quarters to provide auxiliary living space when the unit is parked for use or when the manufactured home is assembled at the home site.

Typically, slide-out rooms are supported by telescoping tubes or other actuation mechanisms mounted to the frame of the vehicle. The actuation mechanisms are usually connected to a lower portion of the slide-out room and extended laterally from the vehicle to increase the living space of the vehicle. When the tubes or actuation mechanisms are retracted, the slide-out room is likewise retracted into the main living area of the vehicle. Sealing is provided to seal the slide-out room in both the extended and retracted positions. However, the slide-out room is only semi-rigid, and portions of the room furthest from the actuation mechanisms (normally along the top edge), are not sufficiently rigid that engagement with the seals can be assured. The actuation mechanisms of slide-out rooms can be adjusted so that the portions of the room closest to the actuation mechanisms, which is the portion of the room closest to the frame and floor, are maintained against the seals when the room is retracted, but the portion of the room furthest away, such as that portion of the room adjacent the ceiling, may deflect sufficiently that the seals are not engaged.

Accordingly, it has become customary to use so-called "travel locks" to latch and maintain the top of the slide-out room in a position in which the slide-out room is engaged with and sealed against the main living area all around the slide-out room. Such latching mechanisms are generally positioned on the inside of the vehicle along the side wall opening. When the room is retracted into the vehicle, the latching mechanisms are engaged to lock the room against the side wall of the vehicle such that the room outer wall is compressed against the vehicle side wall along the periphery of the side wall opening to provide the desired seal. These latching mechanisms, however, are cumbersome and inconvenient to operate.

Moreover, since the latching mechanisms are manual, the vehicle operator must remember to lock the room into its retracted position before travel, and to unlock the latching mechanisms before extending the room to its in-use position. If the latching mechanisms are not engaged during travel, the elements may enter the main living area of the vehicle causing damage. If the latching mechanisms are not disengaged before an attempt is made to extend the slide-out room to its in-use position, the actuation mechanism, the slide-out room, or other components of the vehicle may be seriously damaged.

To further complicate matters, any device used to lock the room in its retracted position cannot interfere with the peripheral seal between the slide-out room and the vehicle side wall. A bulb seal or other sealing structure is generally mounted to the room lip or the side wall of the vehicle and compressed between the lip and the side wall when the room is in its retracted position. Additionally, wiper seals or other such weather stripping is typically mounted along the vertical edges of the side wall opening. These seals wipe along the side walls of the room to remove moisture as the room is retracted into the main living area of the vehicle. Accordingly, it is desirable to provide a mechanism to improve sealing, particularly along the top of the slide-out room, that does not interfere with these existing sealing methods.

SUMMARY OF THE INVENTION

The present invention provides a main living area with a slide-out room providing an auxiliary living area. The slide-out room floor is movable over the main area floor during extension and retraction of the slide-out room. The slide-out room assembly includes compressible seals to seal the main and auxiliary living areas. An extensible mechanism attached between the main floor and slide-out room floor is configured so that the slide-out room tilts as it moves into its extended and retracted positions thereby compressing the seals and producing a tighter seal between the main living area and the slide-out room. A drive mechanism is included for moving the slide-out room between its extended and retracted positions.

In another version of the invention, the slide-out room has a back wall forming an outer sealing lip between the back wall and the main living area when the slide-out room is in the retracted position. An inner flange forms an inner sealing lip between the inner flange and an inner surface of the main living area when the slide-out room is in the extended position. The slide-out room assembly includes a mechanism that tilts the slide-out room relative to the main living area when extended or retracted to provide sealing between the inner sealing lip and the inner surface when extended and between the outer sealing lip and outer surface when retracted.

These and other advantages of the present invention will become apparent from the following description, with reference to the accompanying drawings.

DETAILED DESCRIPTION OF EMBODIMENTS OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 1:
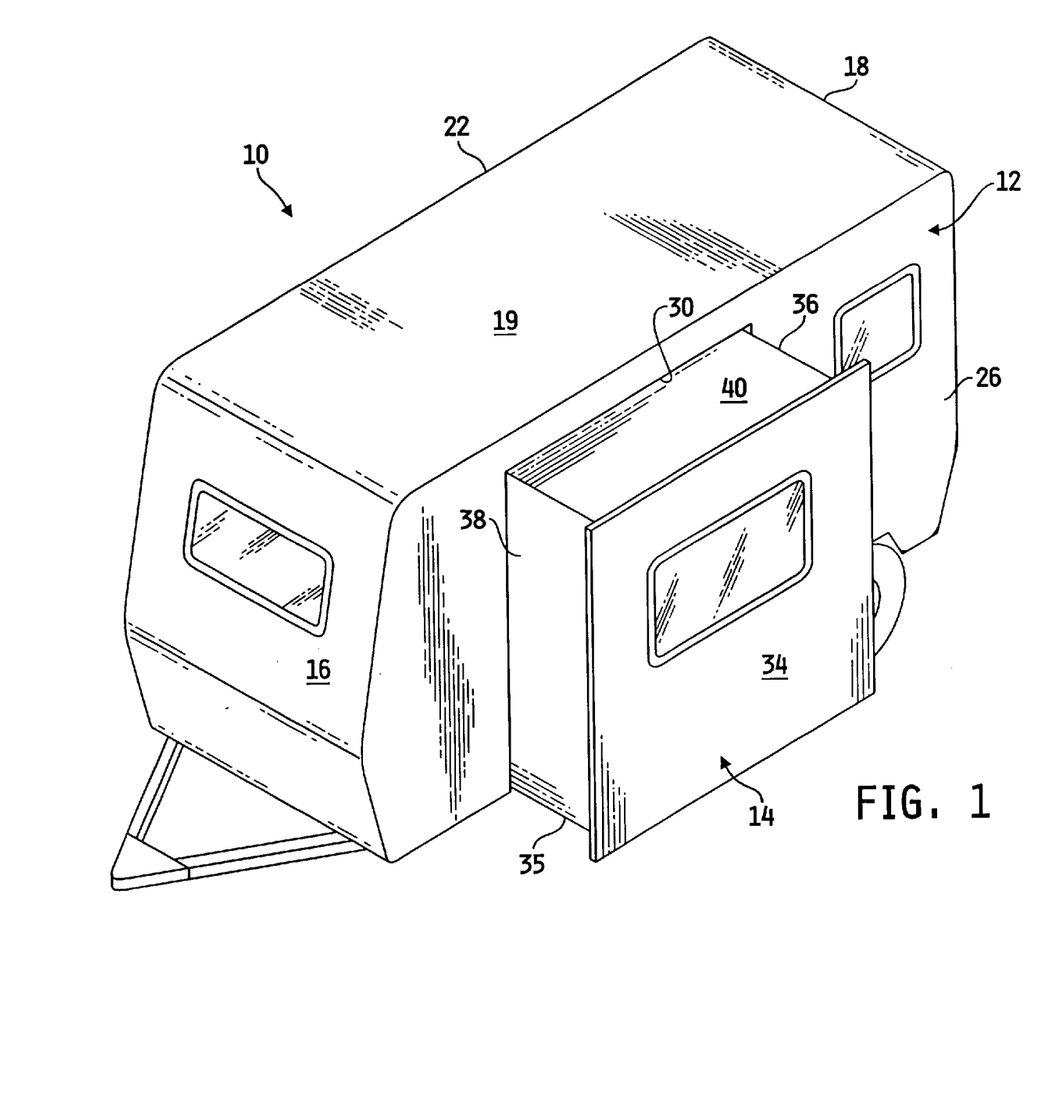
FIG. 1 is a top perspective view of a recreation vehicle having a slide-out room in the extended position.

Referring to FIG. 1 of the drawings, mobile living quarters generally indicated by the numeral 10 includes a main living area generally indicated by the numeral 12 and an auxiliary living area or slide-out room generally indicated by the numeral 14. Main living quarters 12 further include a ceiling 19, a side wall 22, a pair of end walls 16 and 18, and a side wall 26 opposite the side wall 22, a portion of which is cut away to define an opening 30 through which the slide-out room 14 extends and retracts.

With reference still to FIG. 1, the slide-out room 14 generally includes back wall 34, a pair of side walls 36 and 38, a ceiling 40, and a floor 35. The side walls 36 and 38, the ceiling 40, and the floor 35 define the auxiliary living space 58 (FIGS. 2 and 3) which is open to the main living quarters.

Figure 2:
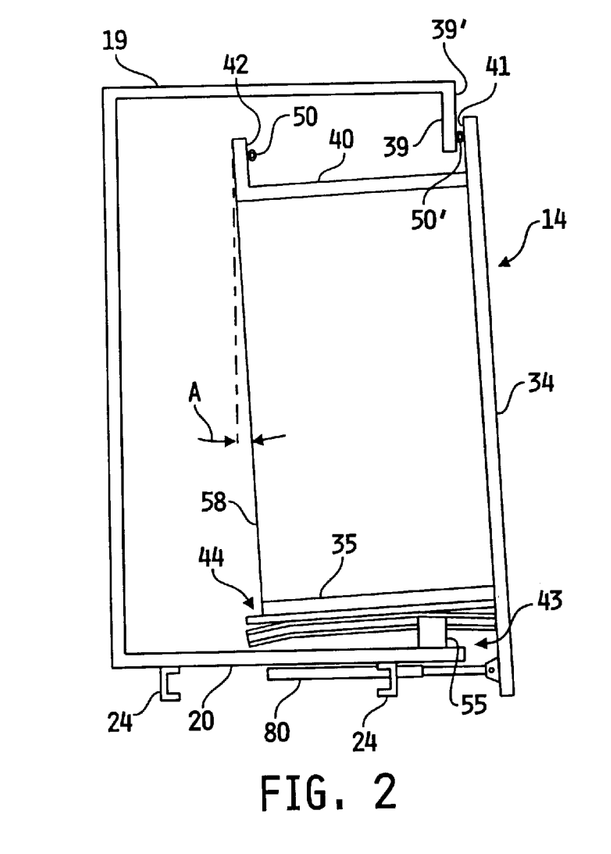
FIG. 2 is a cross sectional view of a recreation vehicle having a slide-out room with a travel tilt mechanism according to one embodiment of the present invention, the slide-out room being shown in its retracted position.
Figure 3:
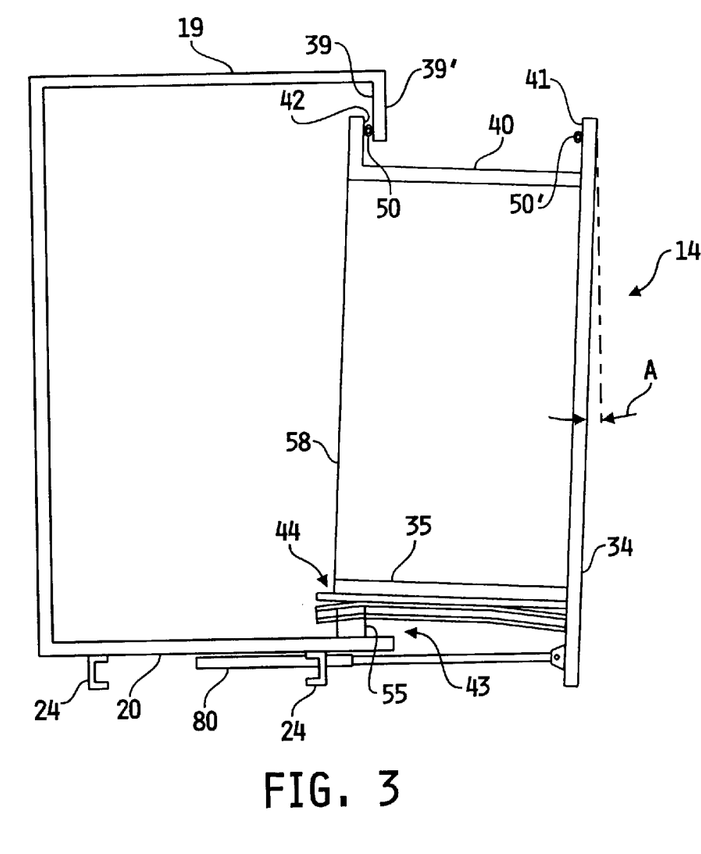
FIG. 3 is a cross sectional view of a recreation vehicle having a slide-out room with a travel tilt mechanism according to one embodiment of the present invention, the slide-out room being shown in its extended position.

Side cross sectional views of the recreational vehicle are depicted in FIG. 2, with the slide-out room 14 retracted, and FIG. 3, with the slide-out room 14 extended. Longitudinally extending frame members 24, which can take any of several forms commonly known in the art, support the floor 20 of the main living quarters 12. The frame members 24 conventionally are supported by a wheel and axle assembly (not shown) to permit the mobile living quarters 10 to be moved. Compressible seals 50 and 50' extend along the ceiling 40 to engage inner and outer portions of the wall 26 at the aperture 30 to provide sealing of the slide-out room 14 with respect to the main living quarters 12 when the slide-out room 14 is in the fully retracted and the fully extended positions. In FIGS. 2 and 3, compressible seals 50 and 50' are attached to sealing surfaces 42 and 41, respectively. These compressible seals engage corresponding sealing surfaces 39 and 39' on wall 26 of main living quarters 12. The compressible seals could be attached to surfaces 39 and 39' if desired with equally effective results. Extension and retraction of the slide-out room 14 can be accomplished by drive mechanism 60, various forms of which are known in the art.

In the present invention, compression of the seals, 50 and 50', is achieved by tilting the slide-out room 14 slightly as the slide-out room 14 is moved into the fully extended or retracted positions as shown in FIGS. 2 and 3. The tilt of slide-out room 14, indicated by angle A in these figures, is somewhat exaggerated to aid in the understanding of the invention. In general, the vehicle tilting is accommodated through a tilting mechanism 43, which includes slider arm 44 attached to the floor 35 of slide-out room 14 together with a track mechanism shown generally as 55.

Figure 4:
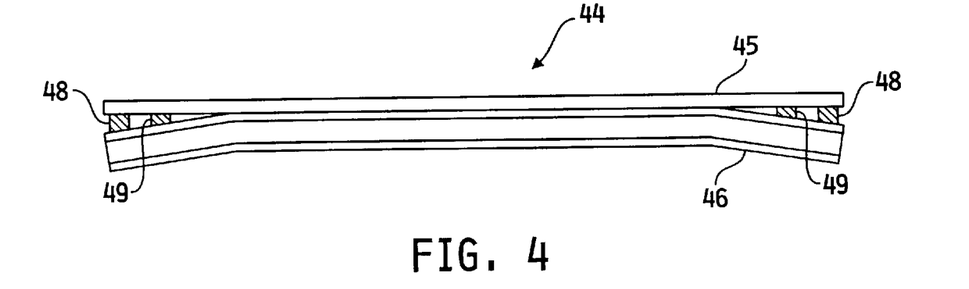
FIG. 4 is a side elevational view of a slider arm according to one embodiment of the present invention.
Figure 5:
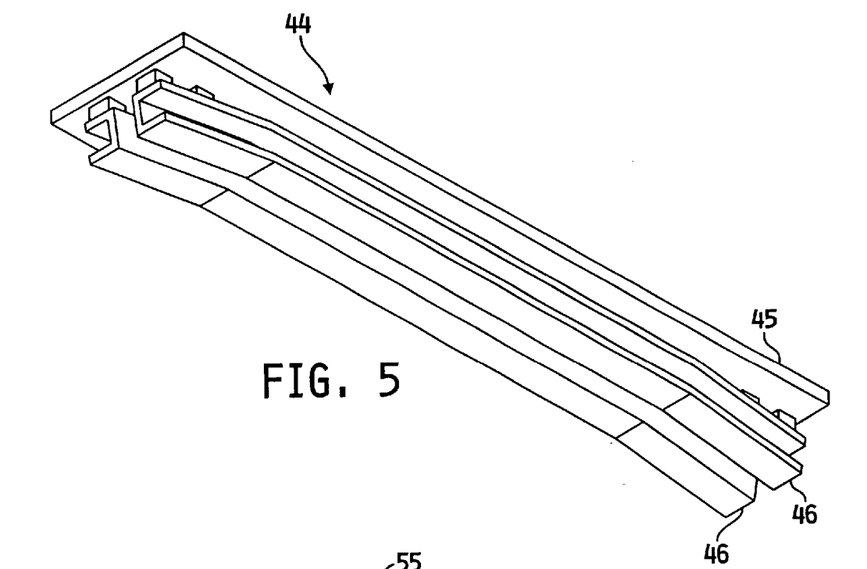
FIG. 5 is a bottom perspective view of a slider arm according to one embodiment of the present invention.

A first embodiment of the slider arm 44 is shown in detail in FIGS. 4 and 5. Slider arm 44 includes a mounting plate 45 which can be attached to the slide-out room floor 35 using suitable fasteners, such as bolts. A pair of slide channels 46 is attached to the opposite side of the mounting plate 45. Slide channels 46 bend downward away from the mounting plate 45 at each of their respective ends, and bracing members 48 and 49 are used to maintain the bend in the slide channels 46. Alternatively, mounting plate 45 could also be bent at each end so that the complete slide arm assembly carries the bends.

Figure 6:
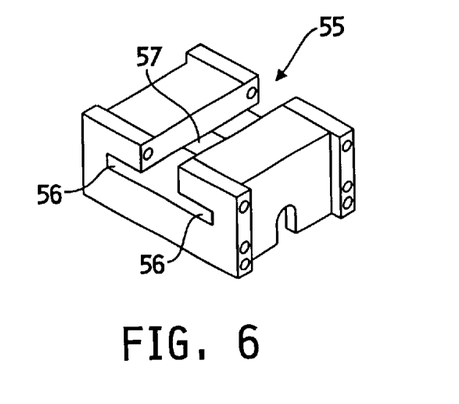
FIG. 6 is a top perspective of a track according to one embodiment of the present invention.
Figure 7:
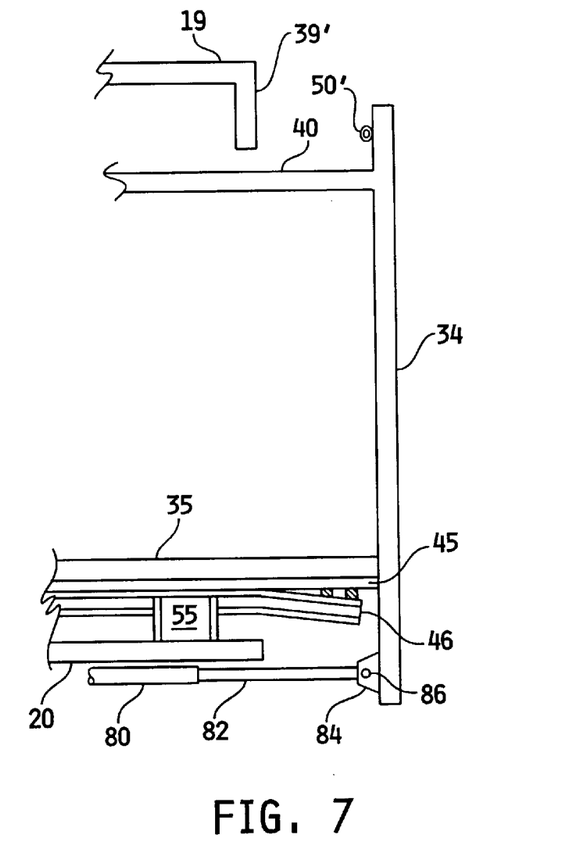
FIG. 7 is a partial side elevational view of a slide-out room incorporating the tilting mechanism of FIGS. 4–6.

As shown in FIG. 6, track 55 is adapted for direct mounting on the top of the main floor 20. Track 55 includes slots 56 and 57 profiled to receive the channels 46 in sliding engagement therethrough. A drive mechanism is presented in FIG. 7 where the slide-out room 14 is actuated by a ram including an outer tube 80 which houses an inner tube 82 connected to the lower portion of back wall 34. The ram is attached to the main living quarters by methods commonly known and used in the art, ram actuation being well known and commonly used for actuating slide-out rooms. The lower portion of back wall 34 includes a mounting bracket 84 for attachment to the inner tube 82. The connection can include a pivot pin 86 to accommodate the angular movement associated with the tilting of the slide-out room 14 as it moves into its fully extended or retracted positions.

Figure 8:
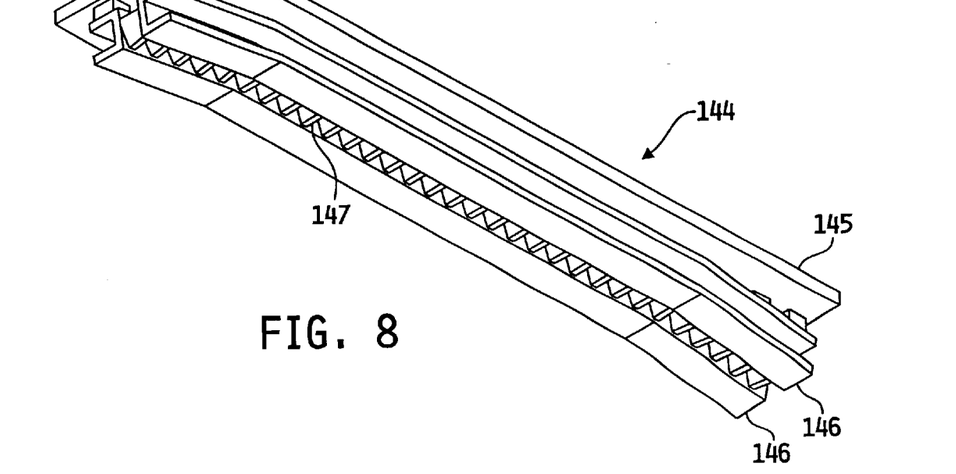
FIG. 8 is a view similar to that of FIG. 5, including a drive rack.
Figure 9:
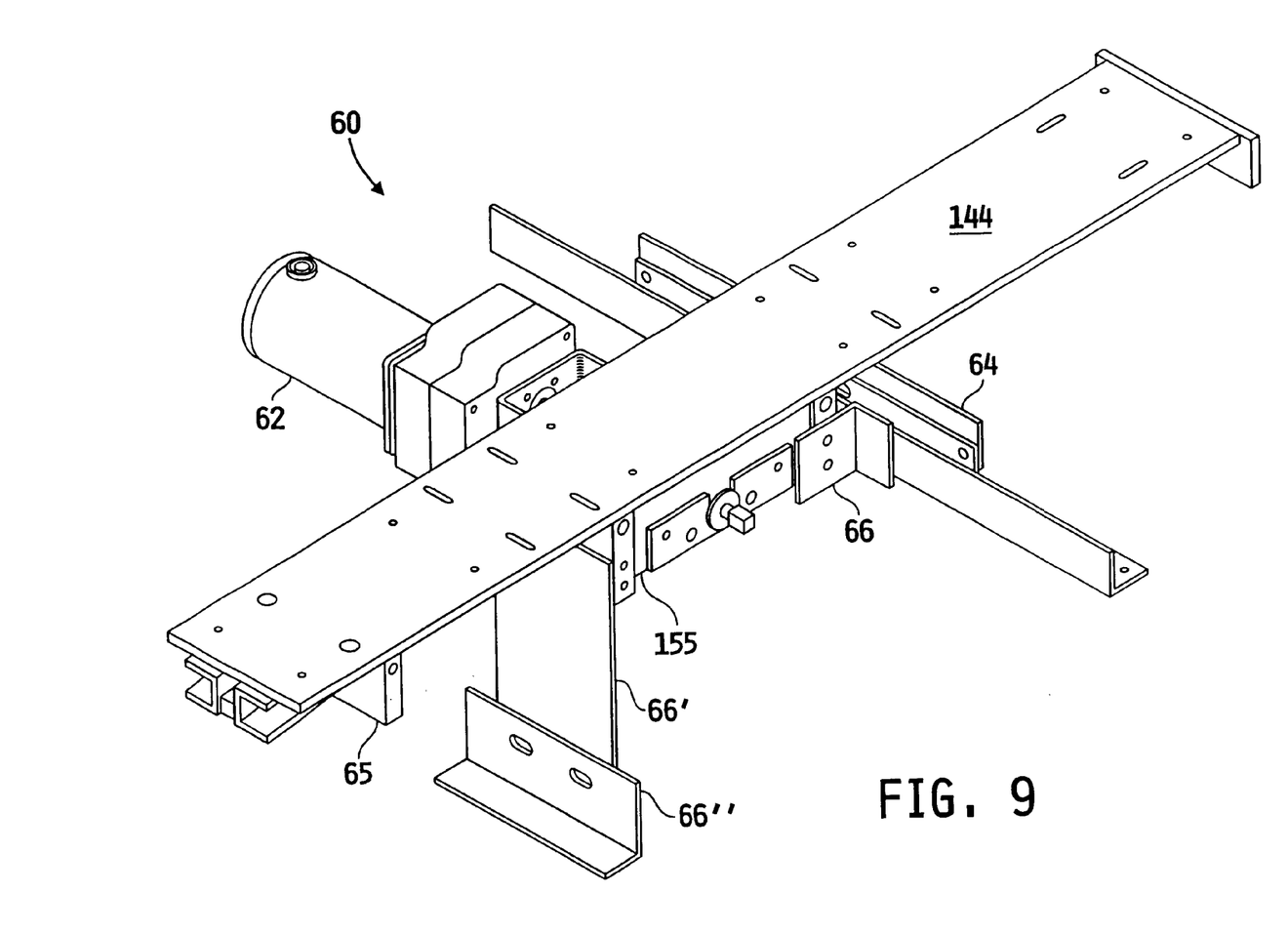
FIG. 9 is a top perspective of a drive mechanism according to one embodiment of the present invention.
Figure 10:
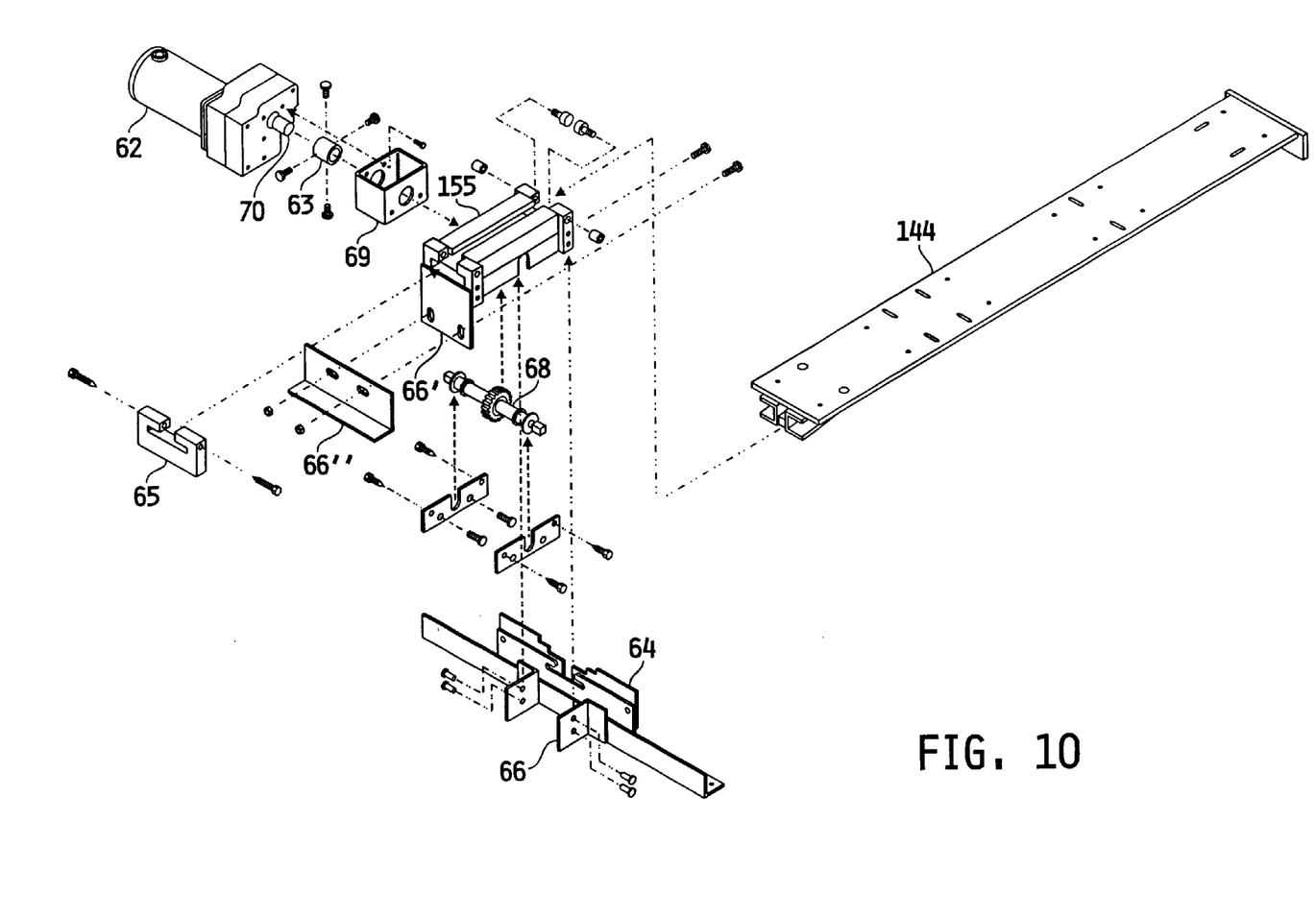
FIG. 10 is an exploded view showing detail components of the drive mechanism of FIG. 9.

A drive mechanism can also be incorporated into the tilt mechanism, where a pinion gear is used to drive the slider arm as shown in FIGS. 8–10. As shown in FIG. 8, a slider is shown at 144 which includes channels 146, attached to a top plate 145. Medially positioned between the channels 146 is a rack 147, which allows the slider 144 to be driven, as will be described herein. As shown in FIGS. 9 and 10, the power source is an electric motor 62. Motor mounting box 69 connects the motor 62 to the track 155. Connecting sleeve 63 connects the motor output shaft 70 to pinion gear 68. The motor 62 drives a pinion gear 68 to operate the slider arm 144 which is attached to the slide-out room floor 35. Stop members 64 and 65 limit the travel of the slider arm 144 outwardly and inwardly, respectively. Brackets 66, 66' and 66" along with other hardware items can be used as necessary to adapt the drive mechanism to the particular application.

In operation, the pinion gear 68 is driven by motor 62 causing the slide-out room 14 to be extended or retracted by driving the slider arm 144, to which the slide-out room is mounted, through the slider track 155. When extending the slide-out room 14, the downward bend of slider arm 144 at its interior end causes the slider arm 144 to be lifted slightly as the interior end enters the track 155. This lifting of the interior end of slider arm 144 causes the slide-out room 14 to tilt outwardly thus inducing further compression of seal 50. Conversely, when retracting the slide-out room 14, the downward bend of slider arm 144 at its exterior end causes the slider arm 144 to be lifted slightly as the exterior end enters the track 155. This lifting of the exterior end of slider arm 144 causes the slide-out room 14 to tilt inwardly thus inducing further compression of seal 50'.

Figure 11:
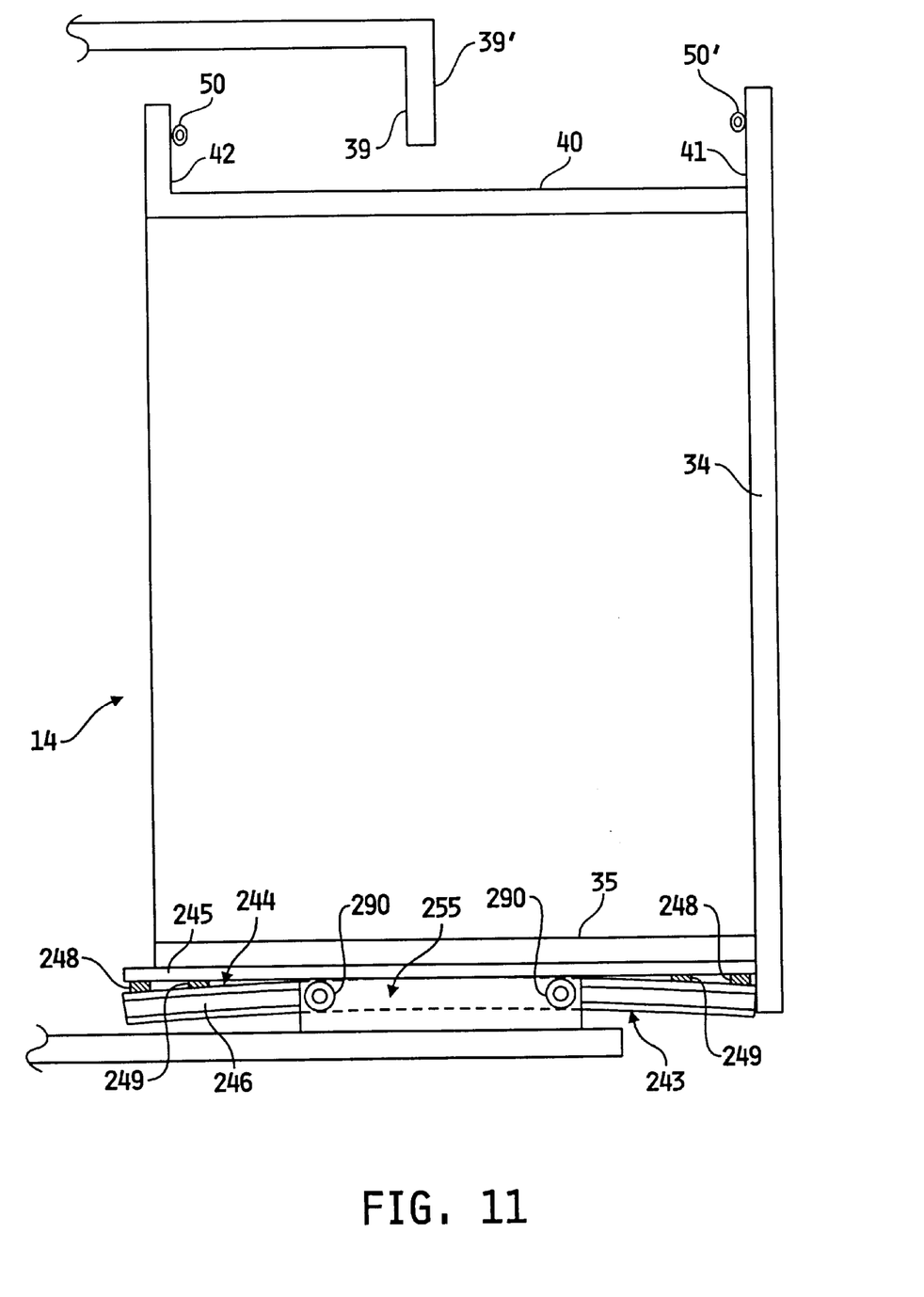
FIG. 11 is a side elevational view of a slide-out room incorporating another embodiment of a tilting mechanism according to the present invention.

Referring now to FIG. 11, another embodiment of the present invention is shown mounted to an RV and a slide out room. This embodiment is similar to the embodiment shown in FIGS. 2 through 7. Accordingly, the reference designations for similar components have been maintained, but increased by 200. A distinction between the embodiments is that slider arm 244 of tilting mechanism 243 is formed into a gradual curve as opposed to a pair of ramp sections connected by a straight, central section. Track 255 includes a drive component, such as a pinion gear (not shown), which mates with a rack (not shown) connected to slider arm 244.

The gradual curving shape of slider arm 244 avoids the potential for binding between the rack and pinion that may be associated with slider arm 44 due to the angled transition between the ramp sections and the central section.

It should be understood that the rollers 290 shown in FIG. 11 may readily be replaced by various other components such as wear bars. Moreover, the above-described rack and pinion drive mechanism may be replaced with a chain and sprocket drive wherein a chain extends between the ends of slider arm 244 and is driven by a corresponding sprocket mounted in track 255. Alternatively, a star wheel may be mounted to track 255 and engage a series of aligned holes formed along the bottom of slider arm 244. These and other basic variations of the principles taught herein are included in the concept of the present invention.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. Transportable living quarters having a main living area and a slide-out room movable relative to said main living area between a retracted position retracted within the main living area and an extended position extended from the main living area to provide an auxiliary living area, said slide-out room having a floor which is movable over a floor of said main living area and at least one seal between said slide-out room and said main living area to seal said main and auxiliary living areas, said slide-out room including a tilt mechanism attached between said slide-out room floor and said main living area floor, and configured so that said slide-out room tilts relative to said main living area when said slide-out room moves between said extended or retracted positions to thereby compress said at least one seal.

2. Transportable living quarters as claimed in claim 1, wherein said slide-out room includes a back wall defining an outer flange projecting away from said auxiliary living area, said outer flange defining a sealing surface, said at least one seal including an outer seal disposed between said sealing surface of said outer flange and a corresponding sealing surface on said main living area so that said outer seal is compressed when said slide-out room moves into said retracted position.

3. Transportable living quarters as claimed in claim 1, wherein said slide-out room includes a ceiling and a pair of opposite side walls, said ceiling and side walls defining an inner flange projecting away from said auxiliary living area, said inner flange defining a sealing surface, and wherein said at least one seal includes an inner seal disposed between said sealing surface of said inner flange and a corresponding sealing surface of said main living area so that said inner seal is compressed when said slide-out room moves into said extended position.

4. Transportable living quarters as claimed in claim 1, wherein said tilt mechanism includes a slider arm guided by a track.

5. Transportable living quarters as claimed in claim 4, wherein said slider arm defines a center section, an interior end, and an opposite exterior end, said ends being inclined relative to said center section so that said slide-out room tilts as said ends engage said track.

6. Transportable living quarters as claimed in claim 4, wherein said slider arm has a substantially curved shape.

7. Transportable living quarters as claimed in claim 4, wherein said drive mechanism includes a rack attached to said slider arm, a pinion gear mounted within said track and in mating engagement with said rack, and a power source driving said pinion to move said slide-out room between said retracted and extended positions.

8. Transportable living quarters as claimed in claim 7, wherein said drive mechanism further includes a pair of stop members disposed to limit the travel of said slide-out room between an extension limit and a retraction limit.

9. Transportable living quarters having a main living area and a slide-out room movable relative to said main living area between a retracted position retracted within the main living area and an extended position extended from the main living area to provide an auxiliary living area, said slide-out room having a floor which is movable relative to said main living area, a back wall which forms an outer sealing lip between said back wall and an outer surface of said main living area when in the retracted position, an inner flange which forms an inner sealing lip between said inner flange and an inner surface of said main living area when in the extended position, and a mechanism which tilts said slide-out room relative to said main living area upon extension and retraction providing sealing between said inner sealing lip and inner surface when extended, and between said outer sealing lip and outer surface when retracted.

10. Transportable living quarters as claimed in claim 9, wherein an outer seal is disposed between said outer sealing lip and said outer surface.

11. Transportable living quarters as claimed in claim 9, wherein an inner seal is disposed between said inner sealing lip and said inner surface.

12. Transportable living quarters as claimed in claim 9, wherein said mechanism includes a slider arm connected to said room floor and a track mounted to said main floor, the track receiving the slider arm.

13. Transportable living quarters as claimed in claim 12, wherein said slider arm defines a center section, an interior end, and an opposite exterior end, said ends being inclined relative to said center section so that said slide-out room tilts as said ends engage said track.

14. Transportable living quarters as claimed in claim 12, wherein said slider arm forms a substantially continuous curve between ends of said slider arm to avoid binding as said slider arm moves through said track.

15. Transportable living quarters as claimed in claim 9, wherein said slide-out room assembly includes a drive mechanism for moving said slide-out room between said extended and retracted positions.

16. Transportable living quarters as claimed in claim 15, wherein said drive mechanism includes a rack attached to said slider arm, a pinion gear rotationally mounted within said track and in mating engagement with said rack, and a power source driving said pinion to move said slide-out room between said retracted and extended positions.

17. Transportable living quarters as claimed in claim 16, wherein said drive mechanism further includes a pair of stop members disposed to limit the travel of said slide-out room between an extension limit and a retraction limit.

* * * * *